United States Patent

Hansson et al.

[11] Patent Number: 6,086,291
[45] Date of Patent: Jul. 11, 2000

[54] TOOL FOR CHIP REMOVING MACHINING

[75] Inventors: Per Hansson, Gävle; Karl-Goran Brask, Sandviken; Per Tägtström, Sandviken; Claes Andersson; Anna Hedberg, both of Gävle, all of Sweden

[73] Assignee: Sandvik AB, Sandviken, Sweden

[21] Appl. No.: 09/159,389

[22] Filed: Sep. 23, 1998

[30] Foreign Application Priority Data

Sep. 24, 1997 [SE] Sweden .................................. 9703434

[51] Int. Cl.$^7$ .................................................. B23B 27/16
[52] U.S. Cl. ........................... 407/110; 407/111; 407/112; 407/117
[58] Field of Search .................................. 407/117, 110, 407/107–109, 113, 102, 111, 112

[56] References Cited

U.S. PATENT DOCUMENTS

| | | |
|---|---|---|
| 4,558,974 | 12/1985 | Pano . |
| 4,738,570 | 4/1988 | Wertheimer . |
| 4,801,224 | 1/1989 | Pettersson et al. . |
| 4,909,677 | 3/1990 | Noguchi et al. ......................... 407/110 |
| 5,035,545 | 7/1991 | Zinner ..................................... 407/110 |
| 5,054,967 | 10/1991 | Noguchi et al. . |
| 5,076,738 | 12/1991 | Pano et al. . |
| 5,360,298 | 11/1994 | Hedlund . |
| 5,924,826 | 7/1999 | Bystrom .................................. 407/103 |
| 5,931,613 | 8/1999 | Larsson .................................. 407/103 |

FOREIGN PATENT DOCUMENTS 21 297   4/1914   United Kingdom .

*Primary Examiner*—Henry W. H. Tsai
*Attorney, Agent, or Firm*—Burns, Doane, Swecker & Mathis, L.L.P.

[57] ABSTRACT

A tool for chip-removing machining includes an insert holder and an insert that is mechanically connected with the holder via upper and lower interfaces. Each interface includes a pair of contact surfaces that extend at an obtuse angle relative to each other. Disposed centrally between one of those pairs of contact surfaces is a ridge, and disposed centrally between the other pair of contact surfaces there is a flute. Each of the recess and flute is defined by side surfaces that extend at an acute angle relative to each other. When the ridge engages the flute, a proper absorption of transverse forces acting upon the insert is guaranteed, whereby the insert is maintained essentially immovable in its position in order to guarantee a proper machining accuracy.

9 Claims, 3 Drawing Sheets

TOOL FOR CHIP REMOVING MACHINING

TECHNICAL FIELD OF THE INVENTION

This invention relates to a tool for chip removing machining, comprising a blade-shaped insert holder of a first material and an insert manufactured from a different, harder material. The insert is mountable in an outwardly opening recess in the holder, said recess being defined between a lower, stiff front portion of the holder and an upper, elastically flexible arm intended to clamp the insert in the recess. The insert is mechanically connectable with the holder via upper and lower interfaces. At least one of the interfaces includes a male part and a female part. The male means is generally V-shaped in cross-section, and has two laterally separated, first contact surfaces that extend at an obtuse angle relative to each other. The female means is likewise generally V-shaped in cross-section, and includes two laterally separated, second contact surfaces that extend at an obtuse angle relative to each other in order to be brought into contact with the first contact surfaces when the insert is inserted into the recess and the male part engages the female part.

BACKGROUND OF THE INVENTION

Tools of the kind generally defined above are usually used for parting, grooving and slit milling. In connection with such working operations, as well as in connection with other chip removing machining in the modern engineering industry, often very strict requirements are raised as regards the tolerances of the machined workpiece. This in turn requires that the insert, on the one hand, be mountable in a very precise, predetermined position in the recess of the insert holder (the so-called insert seat) and, on the other hand, be capable of maintaining this precise position regardless of external action. Thus, the insert should be fixed immovably in its predetermined position relative to the holder not only when it is subjected to ideal main forces that act centrally or tangentially upon the insert (i.e., parallel to the plane of the insert holder), but also in relation to secondary transverse forces that strive to displace the insert sideways relative to the recess or the insert seat. Also small displacements of the insert sideways may lead to unacceptable tolerance deviations of the finished product.

Other requirements, that are basically contradictory in relation to the requirements as regards safe and precise clamping of the insert in the insert holder, are present in connection with the manufacturing of both the insert and the insert holder. Considered only from the point of view of the manufacturer it is thus desirable with the most moderate tolerance requirements that are possible, especially from the background that the components be manufactured in different processes and from different materials that among themselves have different properties. Modern inserts are manufactured from hard materials, like cemented carbide or ceramics. The most outstanding property of such cutting bodies is that they have high hardness and high wear resistance, implying a long life also in connection with machining of comparatively tough materials, like metals. However, a property of the hard body that is less desirable in practice is its brittleness; something that among other things means that the body runs a risk of being cracked or split in connection with unfavorable loading. Even if optimal manufacturing conditions always are sought, the manufacturing result as regards tolerances may in practice vary most considerably. The insert holders are usually manufactured from steel, this being an essentially softer and tougher material than cemented carbide. Also when the insert holders are manufactured, the result in practice varies as regards the achieved tolerances.

In theory, absolute maximum fixing of the insert in the insert seat would be achieved if as large surfaces as possible of the insert and the insert seat respectively initially could be maintained firmly abutting each other. In connection with practical series production it is, however, not possible, for the reasons given above, to separately manufacture on one hand all the inserts and on the other hand all the insert holders with such high precision that cooperating profile surfaces in the interfaces between inserts and insert holders fit absolutely perfectly into each other. In practice, the contact between the inserts and insert holders in the individual interface is established in two or at most three points or contact spots spaced-apart cross-section-wise (if more than three contact spots are present so-called redundant positioning would arise, i.e., the insert would initially be unstable and could tilt between different positions).

A circumstance that per se is not directly unfavorable for the determination of the position of the insert is that the insert after a certain, often short time of operative load imparts a certain plastic deformation to the insert holder. That plastic deformation will cause the insert to "settle". However, said deformation must not become so accentuated that the insert is distanced laterally from a central, predetermined position. Neither must the relative movements between insert and insert holder, in connection with plastic deformation, become so large that the more brittle insert runs a risk of being cracked and/or split.

PRIOR ART

During the last decades many attempts have been made to deal with the problems mentioned above and to create tools that on one hand allow stable fixing of the insert, and thus proper precision, when the workpieces are manufactured, and on the other hand, to establish moderate requirements as regards tolerances of the inserts and the insert holders respectively when they are manufactured. It is common for the solutions hitherto presented to use an interface comprised of a male part and a female part, said parts being V-shaped in cross-section. Such an interface would be located at at least one of the upper and lower interfaces which the insert forms with the clamping arm and the holder respectively. It is characteristic for these known solutions that the flanks or contact surfaces of said male part and female part, respectively, have been comparatively flat, and the obtuse angle between the contact surfaces is within the range of 120–179°. This relatively large obtuse angle guarantees on the one hand, that the ability of the surfaces to absorb high radial forces or central main forces upon the insert is satisfying and on the other hand that the risk for splitting of the insert is minimized. Examples of tools according to this prior art can, for instance, be found in Pano U.S. Pat. No. 4,558,974; Petersson et al. U.S. Pat. No. 4,801,224; Nocuchi et al. U.S. Pat. No. 5,054,967; Wertheimer et al. U.S. Pat. No. 4,738,570; Hedlund U.S. Pat. No. 5,360,298; Pano et al. U.S. Pat. No. 5,076,738; and International Publication No. WO96/17706. From U.S. Pat. No. 5,076,738 (EPO Publication No. 0 417 862), a tool is furthermore known that in the interface between insert and insert holder includes a cylindrical, convex surface that engages a groove having several, curved convex surfaces that effect only linear contact between the surfaces.

A general disadvantage of such previously known tools is that the inserts have a poor transverse stability since they are rather easily dislodged from a desired position due to the action of transverse forces.

From British Patent No. 21,297 a tool is previously known which may be in the shape of a slotting milling cutter or a circular saw blade that apart from a supporting body includes a number of detachable teeth that are connected with the body in interfaces. Each interface includes a central ridge and a flute corresponding to said ridge, said ridge engaging said flute. However, in this case there are no inclined side surfaces at the side of the ridge and the flute, respectively, that together form a V-shaped male part and a V-shaped female part, respectively. In connection with that tool, firm surface contact is required not only between the outside of the ridge and the inside of the flute, but also between the pairs of contact surfaces present at both sides of the ridge and flute, respectively, and extending perpendicular to the plane of the body. Such a surface contact will not be successfully realized in connection with the manufacturing technique of the modern engineering industry.

SUMMARY OF THE INVENTION

The present invention aims at overcoming the disadvantages mentioned above in connection with previously known tools and creating improved tool. A primary object of the invention is to create a tool whose insert has an initially good stability and safe fixing even though the requirements of dimensional accuracy in connection with the manufacturing of both inserts and insert holders are moderate. A further object of the present invention is to create a tool where the risk of cracking or splitting of the insert is minimal.

According to the invention at least the primary object is realized by a tool for chip-removing machining. The tool comprises a blade shaped insert holder formed of a first material, and an insert manufactured from a different, harder material. The insert is mountable in an outwardly opening slot of the holder. The recess is defined between a stiff base portion of the holder and an elastically flexible clamping arm. The insert engages the clamping arm and the base portion to form respective interfaces, at least one of which includes a male part and a female part. The male part is generally V-shaped in cross section and has a pair of laterally separated, first contact surfaces extending at a first obtuse angle relative to each other. The female part is generally V-shaped in cross section and has a pair of laterally separated second contact surfaces extending at a second obtuse angle relative to each other to contact the first contact surfaces when the insert is inserted into the slot. One of the male part and female part includes, between the respective pair of contact surfaces thereof, a ridge. The other of the male part and female part includes, between the respective pair of contact surfaces thereof, a flute for receiving the ridge. The ridge includes two ridge side surfaces interconnected by a top surface. The ridge side surfaces form a first acute angle between one another. The flute includes two flute side surfaces interconnected by a bottom surface. The flute side surfaces extend at a second acute angle relative to one another. The ridge has a height which is shorter than a depth of the flute to form a first gap between the top surface and the bottom surface. A transition is formed between each of the contact surfaces and a respective one of the side surfaces. The transitions on the male part are spaced from respective transitions on the female part to form second gaps. A nominal width of the ridge defined by the ridge side surfaces is shorter than a nominal width of the flute defined by the flute side surfaces, to form third gaps between the ridge side surfaces and the respective flute side surfaces. The insert holder is compressible in response to a transverse load applied to the insert, to close one of the third gaps to create three point contact between the insert and the holder.

BRIEF DESCRIPTION OF THE DRAWINGS

The objects and advantages of the invention will become apparent from the following detailed description of a preferred embodiment thereof in connection with the accompanying drawing in which like numerals designate like elements and in which.

DETAILED DESCRIPTION OF A PREFERRED EMBODIMENT OF THE INVENTION

Figure 1:
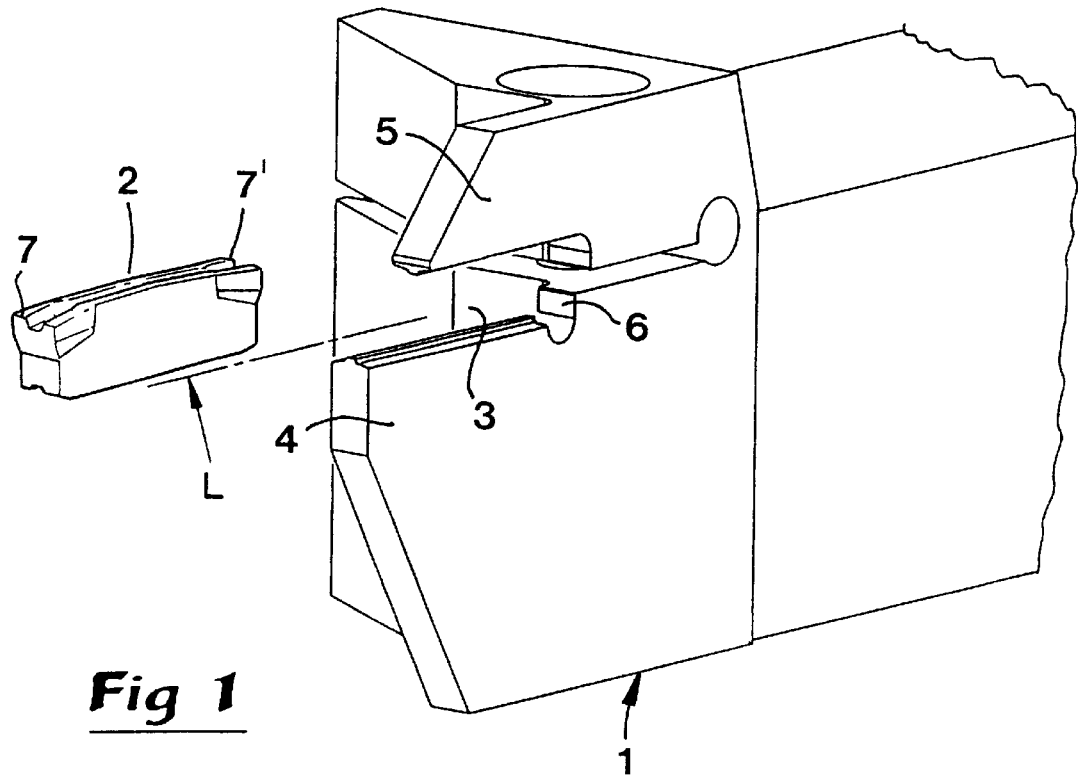
FIG. 1 is an exploded perspective view of a tool comprising an insert holder and an insert spaced apart therefrom.

The tool shown in FIG. 1 includes, on one hand, at least a partly blade-shaped insert holder 1 and, on the other hand, an interchangeable cutting insert 2. The cutting insert is mountable in an insert seat 3 in the form of a slot extending in a longitudinal direction L, a bottom of which is defined by a stiff front base portion 4 of the holder, and a top of which is defined by an elastically flexible arm 5 intended to clamp the insert in the insert seat. At an inner end of the insert seat there is an abutment surface 6 that the insert is intended to contact in the active operative position. Preferably, but not necessarily, the insert is of an indexable type since it includes cutting edges 7, 7' at opposite ends. The cutting insert is manufactured from a material that is harder than the material of the insert holder. In practice, cemented carbide is preferred for the cutting insert 2 and steel for the insert holder 1.

The insert is attached to the holder via upper and lower interfaces that in the disclosed embodiment both include a generally V-shaped male part (as seen in cross-section), and a likewise generally V-shaped female part, (as seen in cross-section). Those parts will be described more in detail with reference to FIGS. 3 and 4. In the example according to FIGS. 1 and 2, said male part is, in the upper interface, disposed on the lower side of the clamping arm 5 in order to cooperate with a V-shaped female means formed in the upper side of the cutting insert. In the lower interface the male part is located on the upper side of the front portion 4 in order to cooperate with a corresponding female part formed in the lower side of the cutting insert. In this connection it should be pointed out that the expressions "upper" and "lower" interfaces, respectively, are used only for the aim of simplifying the definition of the invention. Thus, in operation the holder 1 does not need to be positioned vertically with the clamping arm 5 above the front portion. In other words, the tool according to FIG. 1 may be oriented in arbitrary spatial positions.

Figure 3:
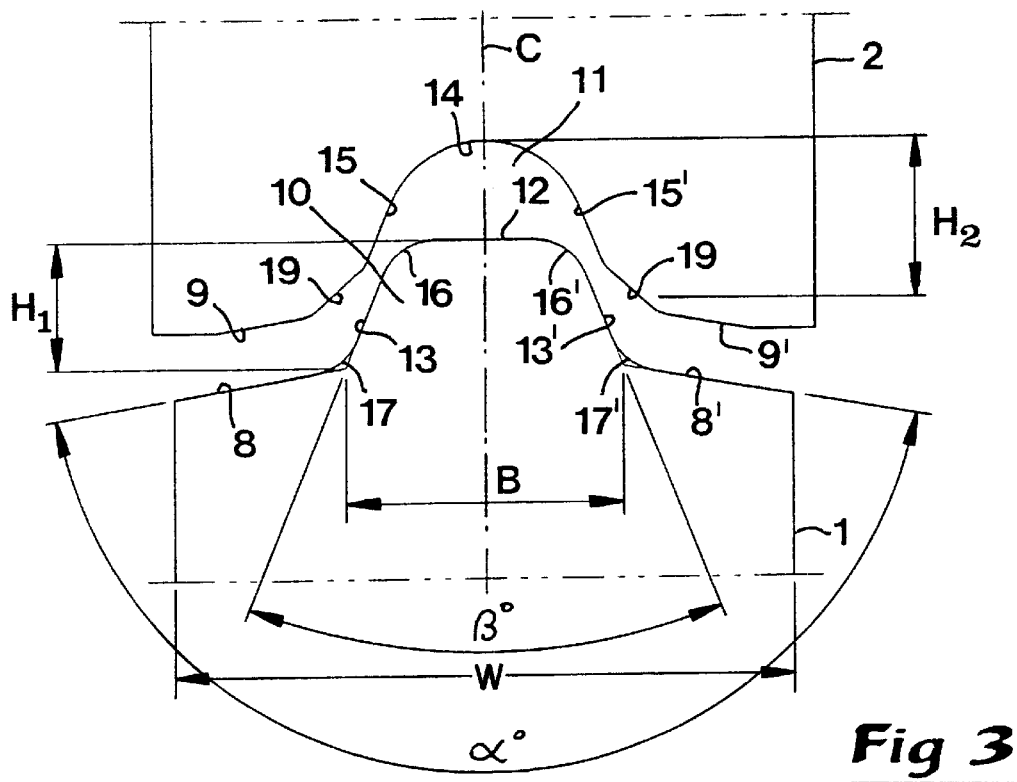
FIG. 3 is an enlarged, schematic cross-section showing the characteristic geometry of the invention in an interface between the insert and the insert holder, said insert being shown somewhat spaced from the insert seat.
Figure 4:
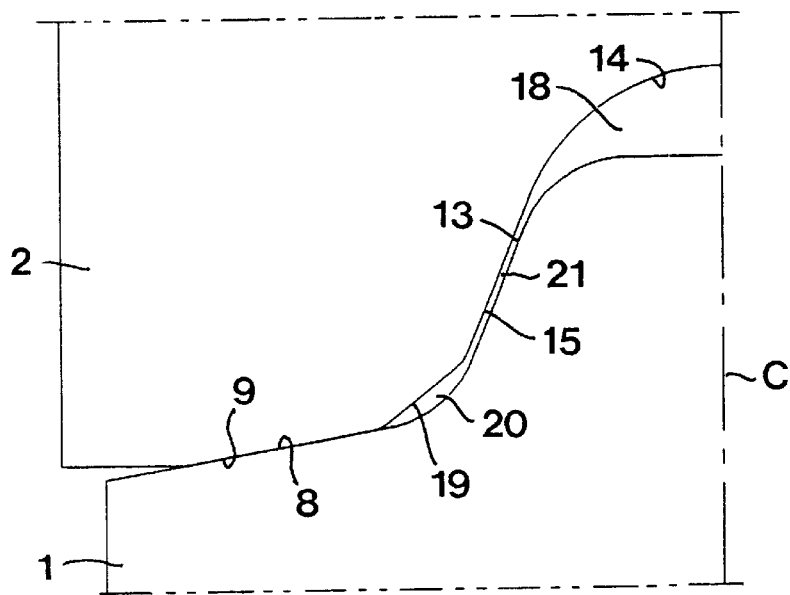
FIG. 4 is a further enlarged, parallel cross-section showing the left half of the same interface, said insert being shown in contact with the insert seat.

Reference is now made to FIGS. 3 and 4 that on an enlarged scale illustrate one of two interfaces between the insert and the insert holder, namely the lower interface. From FIG. 3 it can be seen how the male part mentioned above is formed by two laterally spaced-apart first contact surfaces 8, 8' that extend at an obtuse angle α relative to each other. These first contact surfaces are provided on the insert holder 1. A corresponding female part of the insert 2 is formed by two second contact surfaces 9, 9' that likewise extend at an obtuse angle relative to each other, i.e., at the same angle α as between the surfaces 8, 8'. This means that the pairs of first and second contact surfaces 8, 9 and 8', 9', respectively, will contact each other firmly when the insert is inserted into the insert seat. The obtuse angle a may vary in size but according to the invention it should be in the range of 120–179°, preferably 150–170°. In the disclosed embodiment, the angle a is 160°. Each individual contact surface slopes at a relatively flat angle in relation to a transverse plane extending perpendicular to a central plane C passing through the insert holder. This guarantees that the contact surfaces 8, 8' may bear relatively large forces in the main load direction that is parallel with the central plane C. The inclination of the contact surfaces also, to a limited extent, assists in counteracting a transverse displacement of the insert when said insert is subjected to transverse forces.

Such inserts and insert holders with a female part and a male part, respectively, which are V-shaped in cross-section with a large obtuse angle, are well known in the prior art, as mentioned in the preamble.

According to the invention, a ridge 10 is designed in a central area between the two first contact surfaces 8, 8', the purpose of said ridge 10 being to engage a likewise central flute or recess 11 disposed between said contact surfaces 9, 9'. This ridge is defined by a top surface 12 and two side surfaces 13, 13' that extend at an acute angle β relative to each other. The flute 11 in turn is defined by a bottom surface 14 interconnecting two side surfaces 15, 15'. In the disclosed preferred embodiment the top surface 12 of the ridge is planar and transforms into the side surfaces 13, 13' via convexly rounded transition portions 16, 16'. At their lower portions the side surfaces 13, 13' transform into the first contact surfaces 8, 8' via concavely, rounded transition portions 17, 17'.

In the example, the bottom surface 14 of the flute 11 is arc-shaped in cross-section, e.g., partly cylindrical, for the entire distance between the upper portions of the side surfaces 15, 15'. The height $H_1$ of the ridge 10 is less than the depth $H_2$ of the flute whereby a play or gap 18 is created between the top surface 12 and the bottom surface 14. In other words, the ridge does not bottom out in the flute.

Between each second contact surface 9, 9' and its respective side surface 15, 15' there is a chamfered surface 19, 19'. The angle defined by said two chamfered surfaces 19, 19' is smaller than the obtuse angle formed by the contact surfaces 9, 9' and on the other hand larger than the angle formed by the side surfaces 15, 15' that, like the angle β, is essentially acute. The chamfered surfaces 19, 19' define together with the transition surfaces 17, 17', located inside of said chamfered surfaces 19, 19', secondary (in cross-section crescent-shaped) plays or gaps 20 where the insert makes no contact with the insert holder.

Both the side surfaces 13, 13' of the ridge and the side surfaces 15, 15' of the flute may be planar. However, it is also feasible to design one of the two cooperating surfaces, e.g., the side surface 15 and 15', respectively, of the flute, slightly arched in a convex way while the other surface remains planar.

In an initial state, i.e., before the insert is subjected to an operative load, the width of the ridge 10 in the area of the side surfaces 13, 13' is at least somewhat smaller than the width of the flute between the side surfaces 15, 15'. Thus, when the contact surfaces 8, 8' are brought into firm abutment against the contact surfaces 9, 9', as is shown in FIG. 4, extremely fine gaps 21 are established between the side surfaces 13 and 15 (as well as between 13' and 15').

As regards the rest of the geometry in the shown interface, it should be pointed out that the angle β preferably is within the range of 20–60°, more preferably 35–45°. In the embodiment according to FIG. 3, the angle β is 40°. The maximum width of the ridge 10, measured as the width B of the base in the area of the transition surfaces 17, 17', should in all circumstances be less than 70% of the width W of the insert holder (i.e., the distance between opposite side surfaces of the holder 1). In practice, the width B should be within the range of 20–50, preferably 25–45, and suitably constitute 30–35% of the width W. The height $H_1$ of the ridge 10 should be within the range of 40–70%, preferably 50–60%, of the width B. The depth $H_2$ of the flute 11 should be at least 10% larger than the height $H_1$.

Figure 5:
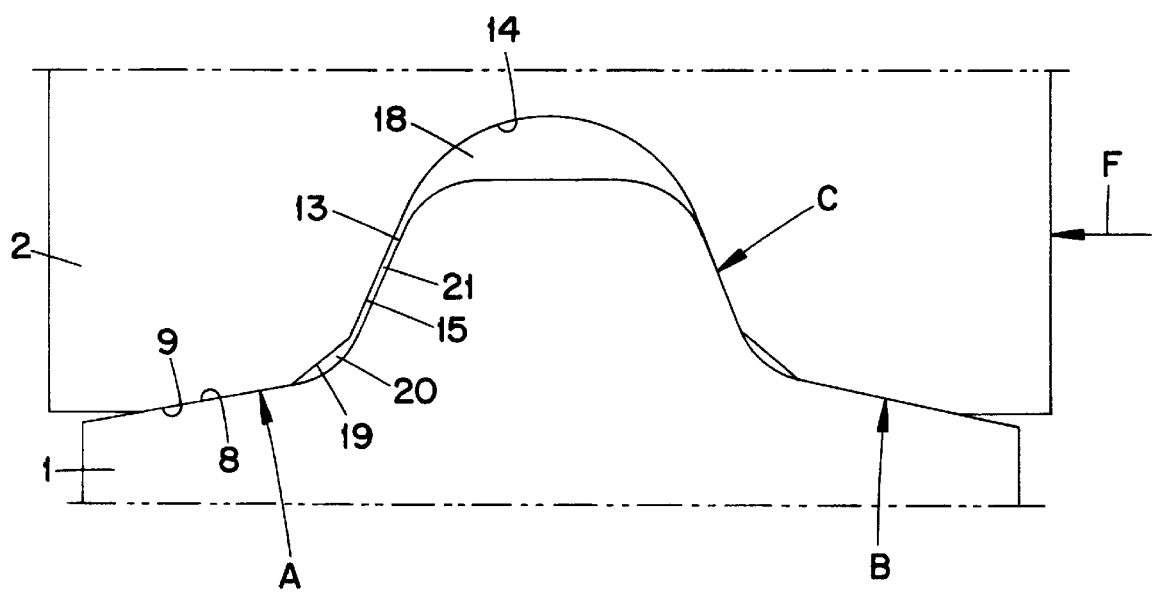
FIG. 5 is a view showing a three-point contact that is established in accordance with the present invention.

In the initial state, when the insert is mounted in the insert seat, but not subjected to any forces other than the spring action from the clamping arm 5, contact is established at two locations in the individual interface, i.e., surface contact between cooperating pairs of first and second contact surfaces 8, 9; 8', 9'. When the insert is then put in operative mode and subjected to forces from the workpiece, i.e., on one hand main forces in the plane C and on the other hand also transverse forces F directed transversely of the longitudinal direction of the slot, the ridge 10 is engaged. Initially a certain plastic deformation takes place in the softer material of the insert holder 4. This will have the effect that the ridge penetrates further into the flute 11 beyond what is shown in FIG. 4. As a result, transverse forces are absorbed as the side surfaces 13, 15 of the ridge and the flute, at one side of the ridge, are caused to contact each other, so as to establish a stable three-point contact, i.e., contact between 8, 9; 8', 9' and either 13, 15 or 13', 15' (by three-point is meant three-surface). One type of three-point contact is depicted in FIG. 5, wherein the contact occurs at three locations A, B, C. Due to the fact that the ridge, as well as the flute, has a distinct height and the side surfaces extend at an acute angle β relative to each other, it is guaranteed that the insert is not displaced to any appreciable degree from its initial position; i.e., a high grade of accuracy is maintained when the workpiece is machined.

Despite the forceful engagement of the tall ridge into the deep flute, the risk for splitting of the insert may, to a considerable degree, be avoided by giving a limited width to the ridge. This guarantees that the moment arm of the wedge force is limited, said wedge force acting from an external side surface of the ridge toward a cooperating internal side surface of the flute. In this connection it should also be pointed out that the penetration of the ridge into the flute is limited by the presence of the initial gap 21 between the side surfaces 13, 15, also in such cases when the plastic deformation of the insert holder is considerable.

FEASIBLE MODIFICATIONS OF THE INVENTION

Figure 2:
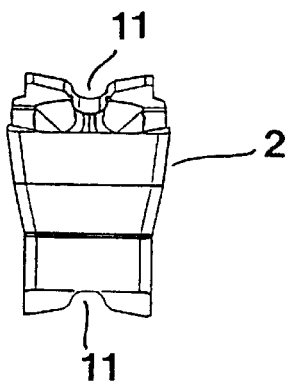
FIG. 2 is an enlarged end view of the insert according to FIG. 1.

The invention is not restricted to the embodiment described and shown in the drawings. Alternatively, it would be feasible to connect the insert with the insert holder via a combination of a ridge and a flute in only one of the two upper and lower interfaces where the insert respectively engages the clamp arm and the base portion 4 of the holder. It is also feasible to provide a central flute between the two first contact surfaces that together form a V-shaped male part in cross-section, while the ridge is provided centrally between two other contact surfaces forming a corresponding female means. Although the insert has upper and lower central flutes in the given embodiment (as is shown in FIGS. 1 and 2), while corresponding ridges are provided in the insert seat, it is alternately possible to provide the insert with a flute and a ridge in order to cooperate with a ridge and a flute, respectively, in the insert seat. It should also be mentioned that the ridge per se may be composed of two or more axially spaced-apart projections, this being effected by spaces or recesses, said projections being localized to the inner and outer ends of the insert and insert holder. It should also be pointed out that the insert seat and the seat, respectively (and thereby the ridges and the flutes, respectively) need not necessarily be linear. Thus, they could be slightly curved or "banana-shaped".

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A cutting insert holder assembly for chip-removing machining, comprising a blade-shaped insert holder formed of a first material, and an insert manufactured from a different, harder material; said insert being mountable in an outwardly opening slot of the holder; said slot extending in a longitudinal direction and being defined between a stiff base portion of the holder and an elastically flexible clamping arm of the holder; said insert engaging said clamping arm and said base portion to form respective interfaces, at least one of the interfaces including a male part and a female part; said male part being generally V-shaped in cross-section and having a pair of laterally separated, first contact surfaces extending at a first obtuse angle relative to each other; said female part being generally V-shaped in cross-section and having a pair of laterally separated, second contact surfaces extending at a second obtuse angle relative to each other to contact respective ones of said first contact surface when said insert is inserted into said slot; the improvement wherein:

one of said male part and said female part including, between the respective pair of contact surfaces thereof, a ridge;

the other of said male part and said female part including, between the respective pair of contact surfaces thereof, a flute for receiving said ridge;

said ridge including two ridge side surfaces interconnected by a top surface, said ridge side surfaces forming a first acute angle between one another;

said flute including two flute side surfaces interconnected by a bottom surface, said flute side surfaces extending at a second acute angle relative to one another;

said ridge having a height shorter than a depth of said flute to form a first gap between said top surface and said bottom surface;

a transition formed between each of said contact surfaces and a respective one of said side surfaces, said transitions on said male part being spaced from respective transitions on said female part to form second gaps;

a nominal width of said ridge defined by said ridge side surfaces being shorter than a nominal width of said flute defined by said flute side surfaces to form third gaps between said ridge side surfaces and said respective flute side surfaces;

said insert holder being deformable in response to a transverse load being applied to said insert transversely of the longitudinal direction sufficiently to close one of said third gaps to create three-point contact between the insert and the holder, the three-point contact defined by contact between one of the first contact surfaces and one of the second contact surfaces, contact between the other of the first contact surfaces and the other of the second contact surfaces, and contact between the ridge side surface and the,,flute side surface which defines the closed third gap.

2. The assembly according to claim 1 wherein each of said first and second obtuse angles is in the range of 120–179°.

3. The assembly according to claim 2 wherein each of said first and second obtuse angles is in the range of 150–170°.

4. The assembly according to claim 2 wherein each of the first and second acute angles is in the range of 20–60°.

5. The assembly according to claim 4 wherein each of the first and second acute angles is in the range of 35–45°.

6. The assembly according to claim 1 wherein a maximum width of said ridge is no more than 70% of a width of said insert holder.

7. The assembly according to claim 1 wherein said ridge side surfaces are planar.

8. The assembly according to claim 7 wherein said flute side surfaces are planar.

9. The assembly according to claim 1 wherein said transition formed between each contact surface and a respective side surface of said male part is concavely curved, said transition formed between each contact surface and respective side surface of said female part is a chamfered surface.

* * * * *